United States Patent
Yuan et al.

(10) Patent No.: US 8,702,860 B2
(45) Date of Patent: Apr. 22, 2014

(54) STABILIZED KAOLIN SLURRY AND METHODS FOR IMPROVING KAOLIN SLURRY STABILITY

(75) Inventors: Jun Yuan, Shanghai (CN); Michael J. Garska, Sandersville, GA (US); Robert J. Pruett, Milledgeville, GA (US)

(73) Assignee: Imerys Pigments, Inc., Roswell, GA (US)

( * ) Notice: Subject to any disclaimer, the term of this patent is extended or adjusted under 35 U.S.C. 154(b) by 839 days.

(21) Appl. No.: 12/910,295

(22) Filed: Oct. 22, 2010

(65) Prior Publication Data

US 2011/0155018 A1 Jun. 30, 2011

Related U.S. Application Data

(62) Division of application No. 11/573,709, filed as application No. PCT/US2005/029062 on Aug. 16, 2005, now abandoned.

(60) Provisional application No. 60/601,619, filed on Aug. 16, 2004.

(51) Int. Cl.
*C09C 1/42* (2006.01)

(52) U.S. Cl.
USPC .......................... 106/400; 106/486

(58) Field of Classification Search
USPC .................. 106/400, 416
See application file for complete search history.

(56) References Cited

U.S. PATENT DOCUMENTS

| | | | |
|---|---|---|---|
| 3,130,063 A | 4/1964 | Millman et al. | |
| 3,171,718 A | 3/1965 | Gunn | |
| 4,078,941 A | 3/1978 | Bundy et al. | |
| 4,451,440 A | 5/1984 | Thompson, III | |
| 4,772,332 A * | 9/1988 | Nemeh et al. | 106/487 |
| 4,806,167 A | 2/1989 | Raythatha | |
| 4,820,554 A | 4/1989 | Jones et al. | |
| 4,859,246 A | 8/1989 | Sennett | |
| 4,889,886 A | 12/1989 | Wada et al. | |
| 5,061,461 A | 10/1991 | Sennett et al. | |
| 5,082,887 A | 1/1992 | Brown et al. | |
| 5,098,583 A | 3/1992 | Cobb et al. | |
| 5,100,472 A | 3/1992 | Fugitt et al. | |
| 5,128,606 A | 7/1992 | Gate et al. | |
| 5,151,124 A | 9/1992 | Rice | |
| 5,227,349 A | 7/1993 | Matthews et al. | |
| 5,232,881 A | 8/1993 | Wu | |
| 5,236,989 A | 8/1993 | Brown et al. | |
| 5,925,454 A | 7/1999 | Bekele | |
| 6,610,136 B2 * | 8/2003 | Malla et al. | 106/464 |
| 6,616,749 B1 | 9/2003 | Husband et al. | |
| 7,122,080 B2 | 10/2006 | Pruett et al. | |
| 2003/0141224 A1 | 7/2003 | Pruett et al. | |

FOREIGN PATENT DOCUMENTS

| | | |
|---|---|---|
| EP | 0 245 553 A2 | 11/1987 |
| EP | 0 524 635 A1 | 1/1993 |
| EP | 0 528 078 A1 | 2/1993 |
| EP | 0 750 653 B1 | 5/1998 |
| GB | 1 498 086 | 1/1978 |
| GB | 2 240 398 A | 7/1991 |
| WO | WO 99/51815 | 10/1999 |
| WO | WO 00/59841 | 10/2000 |
| WO | WO 00/66509 | 11/2000 |
| WO | WO 00/66510 | 11/2000 |
| WO | WO 02/16509 A1 | 2/2002 |
| WO | WO 03/022933 A2 | 3/2003 |
| WO | WO 2006/023473 A2 | 3/2006 |

OTHER PUBLICATIONS

International Search Report and Written Opinion issued Jul. 25, 2007, for PCT/US2005/029062.
International Preliminary Report on Patentability issued Aug. 30, 2007, for PCT/US2005/029062.

* cited by examiner

*Primary Examiner* — Pegah Parvini
(74) *Attorney, Agent, or Firm* — Finnegan, Henderson, Farabow, Garrett & Dunner, L.L.P.

(57) ABSTRACT

Disclosed herein are stabilized kaolin slurries comprising a kaolin comprising no more than about 80% by weight of particles having an equivalent spherical diameter of less than 2 microns and at least one stabilizer, wherein the stabilized kaolin slurry has a 28-day pour test result of at least about 80% poured. Also disclosed are methods of making such stabilized kaolin slurries.

32 Claims, 1 Drawing Sheet

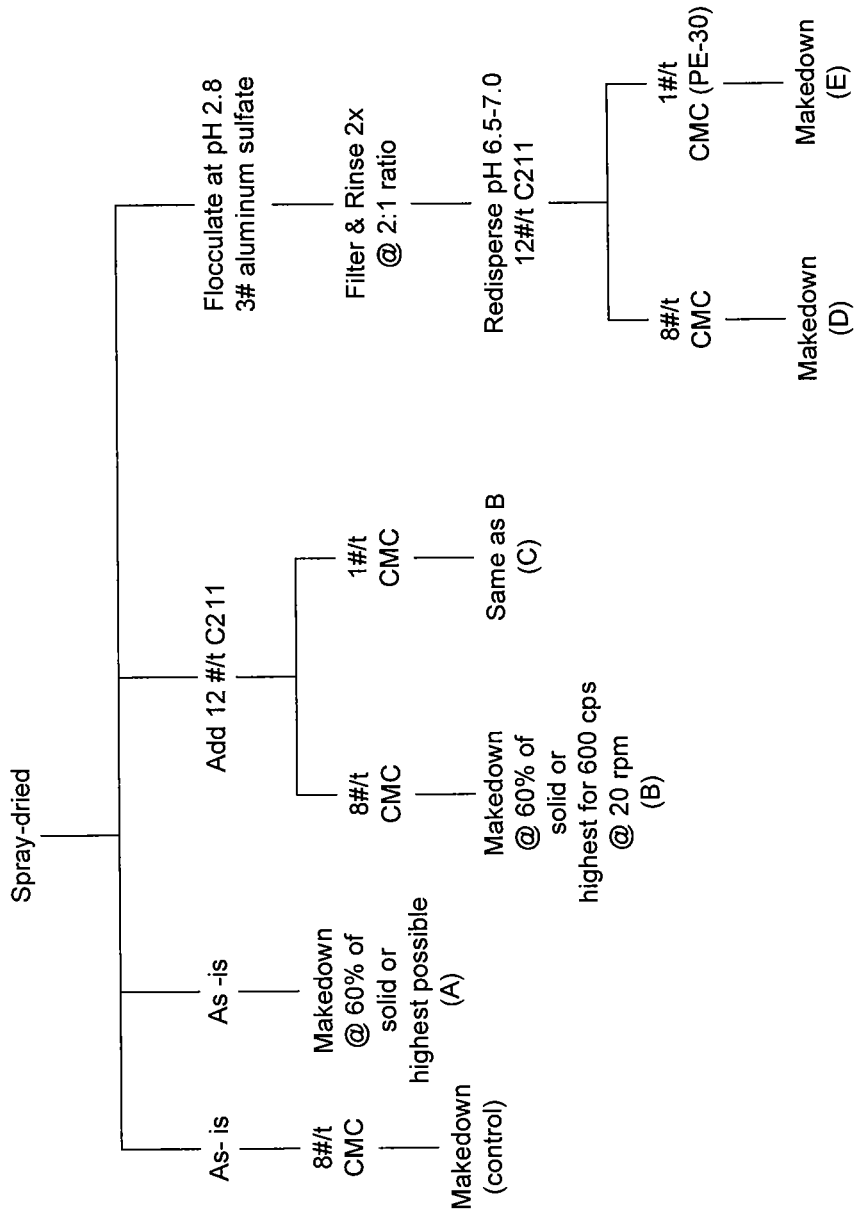

STABILIZED KAOLIN SLURRY AND METHODS FOR IMPROVING KAOLIN SLURRY STABILITY

This application is a divisional of U.S. application Ser. No. 11/573,709, filed Feb. 14, 2007 now abandoned, and claims the benefit of priority of the filing date of PCT International Application No. PCT/US2005/029062, filed Aug. 16, 2005, and U.S. Provisional Patent Application No. 60/601,619, filed Aug. 16, 2004, the disclosures of all of which are incorporated herein by reference.

Disclosed herein are stabilized kaolin slurries and methods of making such stabilized kaolin slurries.

Kaolin clay has many known applications in industry, including, for example, use as a filler in papermaking, a coating for paper, and a pigment in paint. Kaolin products are often shipped in a high solid slurry form. Slurries of coarse platy clays tend to settle quickly, making them difficult to transport. To stabilize kaolin slurries, i.e., to prevent kaolin clay from settling to the bottom of containers as hard sediments during shipping, thickening agents, such as carboxymethylcellulose (CMC), have been used and mixed into the kaolin products in the final slurry makedown. However, such a stabilizing method worked for finer and less platy clays, but has not worked effectively in the past for coarser and/or more platy kaolin clay slurries.

Therefore, there remains a need for developing a method to stabilize coarser and/or more platy kaolin clay slurries. The present inventors have developed methods for stabilizing coarse kaolin slurries.

In one aspect, the present disclosure relates to a stabilized kaolin slurry comprising:

a kaolin comprising no more than about 80% by weight of particles having an equivalent spherical diameter (ESD) of less than 2 microns;

wherein the stabilized kaolin slurry has a solids content of at least about 40%, and a 28-day pour test result of at least about 80% poured, such as at least 85% and further such as at least 89% poured. Such stabilized kaolin slurries are generally sufficiently stable to permit normal shipping and handling.

In another aspect, the present disclosure relates to a method for making a stabilized kaolin slurry by reducing the levels of residual salts in a kaolin slurry, prior to addition of a conventional thickener or stabilizer such as carboxymethylcellulose (CMC) or the like. In the past, such stabilizers have typically been found not to work effectively in coarser and/or platier kaolin clay slurries. Without being bound by any theory, the present inventors hypothesize that residual salts (electrolytes), such as aluminum and calcium, are released over a short period of time after slurry makedown. These residual salts are weakly absorbed by large kaolin particles because of their relatively large proportion of surface areas. Once released, the residual salts react with the stabilizer to reduce its efficacy and preventing effective slurry stabilization.

Accordingly, one aspect of the present disclosure relates to a method of making a stabilized kaolin slurry, comprising:

filtering and rinsing a kaolin slurry to remove salt residue therefrom until the resulting kaolin has a conductivity of no more than about 100 µS;

resolubilizing the resulting kaolin; and adding at least one stabilizer to the resolubilized kaolin slurry.

The conductivity of the kaolin after filtering and rinsing can be, for example, no more than about 100 µS, such as no more than about 80 µS, and even such as no more than about 60 µS.

Another aspect of the present disclosure provides a method of stabilizing a kaolin slurry comprising:

filtering and rinsing the kaolin slurry;

resolubilizing the kaolin slurry; and adding at least one stabilizer;

wherein the stabilized kaolin slurry has a 28-day pour test result of at least 80% poured, such as at least 85% and further such as at least 89% poured.

Another aspect of the present disclosure provides a method of stabilizing a kaolin slurry comprising:

providing a kaolin slurry having a solids content of greater than 40% and comprising no more than about 80% by weight of particles having an equivalent spherical diameter (ESD) of less than 2 microns; and adjusting the pH of the kaolin slurry to a value ranging from about 4.5 to about 6.5 to effect partial flocculation of the slurry.

For example, the pH can be adjusted to a value ranging from about 5.0 to about 6.0, or even from about 5.5 to about 6.0. In some aspects, slurries falling into these pH ranges can often be stabilized without addition of any stabilizer. It may, however, be necessary in some cases to add a small amount of a dispersant to adjust the viscosity of the partially stabilized slurry into a range suitable for pumping.

As disclosed herein, the term "equivalent spherical diameter" (ESD) is a particle size of a given particle, and can be determined by a standard test procedure employing Stokes' Law of Sedimentation. For example, ESD can be determined by measuring the sedimentation of the particulate product in a fully dispersed condition in a standard aqueous medium, such as water, using a SEDIGRAPH™ instrument, e.g., SEDIGRAPH 5100, obtained from Micromeritics Corporation, USA.

As disclosed herein, a coarse and platy kaolin clay refers to, for example, a kaolin comprising no more than about 80% by weight of particles having an ESD of less than 2 microns, such as no more than about 70% by weight of particles having an ESD of less than 2 microns, further such as no more than about 60% by weight of particles having an ESD of less than 2 microns, even further such as no more than about 50% by weight of particles having an ESD of less than 2 microns, and even further such as no more than about 40% by weight of particles having an ESD of less than 2 microns. For example, the coarse and platy kaolin clay refers to a kaolin comprising no more than about 50%, such as no more than about 40%, by weight of particles having an ESD of less than 2 microns. Further for example, the coarse and platy kaolin clay refers to a kaolin comprising from about 20% to about 65% by weight, such as from about 25% to about 60% by weight, further such as from about 25% to about 45% by weight, and even further such as 35% by weight of particles having an ESD of less than 2 microns.

In addition, the kaolin disclosed herein can have a shape factor of, for example, at least about 25, such as at least about 30 and further such as at least about 45. "Shape factor" as used herein is a measure of an average value (on a weight average basis) of the ratio of mean particle diameter to particle thickness for a population of particles of varying size and shape as measured using the electrical conductivity method and apparatus described in GB-A-2240398/U.S. Pat. No. 5,128,606/EP-A-0528078, which are incorporated herein by reference in their entirety, and using the equations derived in these patent specifications.

The stabilized kaolin slurry disclosed herein can have a solids content ranging from about 40% to about 60% by weight relative to the total weight of the slurry, such as from about 45% to about 55%, and further such as from about 50% to about 60% by weight relative to the total weight of the slurry. In other embodiments, the stabilized kaolin slurry has a solids content of at least 40%, such as at least 45%, and further such as at least 50% by weight relative to the total weight of the slurry.

Viscosity is a measure of a clay's resistance to changes in flow. Those having ordinary skill in the art are familiar with typical ways of measuring viscosity, which include, for example, Brookfield viscosity and Hercules viscosity.

Brookfield viscometers provide a measure of a clay slurry's low shear viscosity, expressed in units of centipoise (cp). One centipoise is equal to one centimeter-gram-second unit. (One centipoise is one hundredth ($10^{-2}$) of a poise.) Thus, all other things being equal, a 100 centipoise sample has a lower viscosity than a 500 centipoise sample.

Hercules viscometers provide a measure of a clay slurry's high shear viscosity. Hercules viscosity is typically measured by placing a cylinder (bob) of appropriate diameter and length (typically the A-bob) into a sample clay slurry. Hercules viscosities of various samples can be compared by holding constant the percent solids concentration of the sample, the bob size, and the applied force. The Hercules viscometer applies a force to the bob which causes it to spin at a controlled accelerating rate. As the viscometer increases the bob spin rate, the viscous drag on the cup increases. Clay slurries with poor high shear rheology will exert the maximum measurable force on the cup at a lower bob rpm than clay slurries with "good" high shear rheology. Hercules viscosity is therefore typically expressed in terms of bob spin rates, or revolutions per minute (rpm) as a function of the relative applied force (dynes). A "dyne endpoint" is an indication of very low Hercules viscosity. A dyne endpoint is reached when the bob reaches its maximum rpm before the maximum measurable force is exerted on the cup.

In one aspect, the stabilized kaolin slurry disclosed herein can have a Brookfield viscosity at 50% adjusted solids ranging, for example, from about 300 cps to about 700 cps as determined by a Brookfield model DV.1 digital viscometer using a #2 spindle at 20 rpm. The stabilized kaolin slurry can also have a Brookfield viscosity at 50% adjusted solids of, for example, at least about 400 cps as determined by a Brookfield model DV.1 digital viscometer using a #2 spindle at 20 rpm.

In one embodiment, the stabilized kaolin slurry has a Hercules viscosity at 50% adjusted solids of less than 10 dynes at 4400 rpm using an "A" bob.

When a stabilizer such as carboxymethylcellulose is used, the stabilized kaolin slurry can have a pH ranging, for example, from about 5.5 to about 9.5, and further, for example, from about 6.5 to about 7.5. However, when no stabilizer is used, the pH can typically range from about 4.5 to about 7.5, such as from about 5.0 to about 6.5, further such as from about 5.0 to about 6.0, even further such as from about 5.5 to about 6.0, and even further such as from about 5.7 to about 5.8.

The pour test can be used as an indicator of the long term stability of the kaolin slurries. In the pour test, a number of samples of the slurry are placed into beakers and weighed. At the selected time intervals, one of the beakers is upended and the sample is allowed to pour out for a period of 1 minute. The beaker is then re-weighed and the percentage of sample that successfully poured from the beaker is determined as a percentage of the total initial sample weight. Generally, the higher the pour-test percentage, the more stable the slurry against settling.

The at least one stabilizer disclosed herein comprises, for example, at least one cellulosic thickener, such as CMC. The at least one cellulosic thickener can be chosen, for example, from alkyl celluloses, ethylhydroxyethyl celluloses, hydroxymethyl celluloses, hydroxyethyl celluloses, and hydroxypropyl celluloses. In addition, the at least one stabilizer disclosed herein can be chosen, for example, from montmorillonite, smectite clays, hydrophobically modified ethoxylated urethanes, high molecular weight polyacrylates, polyvinyl pyrrolidone, sodium alginate, xanthan gum, silica thickeners, sodium magnesium silicate, acrylic acid copolymers, and nonionic hydrophobically modified polyethers.

The at least one stabilizer disclosed herein can be present in an amount ranging from about 0.01% to about 4% by weight, such as from about 0.01% to about 2% by weight, relative to the total weight of the slurry.

In one embodiment, the stabilized kaolin slurry disclosed herein is substantially free of any dispersant (i.e., comprising less than 100 ppm by weight of dispersant on a dry basis). In another embodiment, the stabilized kaolin slurry disclosed herein further comprises at least one dispersant. In the case where a dispersant exists in the stabilized kaolin slurry disclosed herein, the at least one dispersant is present in an amount of, for example, less than about 250 ppm on a dry basis, such as ranging from about 100 ppm to about 200 ppm by weight on a dry basis relative to the total weight of the slurry. In another embodiment, the at least one dispersant is present in an amount from about 100 ppm to about 500 ppm by weight on a dry basis, relative to the total weight of the slurry.

The at least one dispersant disclosed herein can comprise, for example, at least one polyelectrolyte chosen, for example, from polyacrylates and copolymers comprising at least one polyacrylate, polyphosphates, and silicates such as sodium silicate, lithium silicate, and ammonium silicate.

According to the method of making a stabilized kaolin slurry disclosed herein, the filtering and rinsing operation of a kaolin slurry by water to remove salt residue can be conducted by any conventional process known in the field. For example, a lab ceramic filter funnel attached with a flask can be used for the filtering and rinsing operation, which simulates the filtering/dewatering action by a typical rotary vacuum filter. The top of the funnel has a shape of a large cup with a flat and porous bottom. Filter paper is placed on the porous bottom of the funnel cup. Slurry is poured into the cup. The flask attached below the funnel is connected to a vacuum pump that pulls the water through filter paper into the flask. After filtering out the water, a moisten cake of the kaolin forms in the cup. Additional water may then be poured into the cup one or more times to effect the rinsing operation. Other conventional dewatering methods that may be used in accordance with the present invention further include clarification, settling, centrifugal washing, rotary vacuum filtration and pressure filtration.

In measuring the conductivity of the resulting kaolin after filtering and rinsing, 10 g of clay slurry or filter cake of the kaolin on a dry basis diluted to 10% solids with de-ionized water is used. The conductivity is measured using a conductivity probe of a conductivity meter by conventional methods known in the field, such as through the use Orion Model 120 Conductivity Meter, in the unit of mS or µS.

In one embodiment, a kaolin slurry is stabilized using the method disclosed herein and has a 28-day pour test result of at least 80% poured, such as at least 85% poured, and further such as at least 89% poured.

In some embodiments, substantially no dispersant is added to the kaolin slurry in the method disclosed herein. But in other embodiments, the method of making a stabilized kaolin slurry disclosed herein further comprises adding at least one dispersant. The at least one dispersant can be the same as described as above. It can be present in an amount ranging, for example, from about 100 ppm to about 200 ppm by weight, relative to the total weight of the slurry on a dry basis.

The method of making a stabilized kaolin slurry disclosed herein can further comprise flocculating a kaolin slurry prior to the filtering and rinsing operation. The flocculation can be accomplished by any conventional process known in the field. For example, the flocculation can be accomplished by lowering the pH of the kaolin slurry to a value of about 5 or less.

In addition, the method of making a stabilized kaolin slurry can further comprise spray drying a kaolin slurry prior to the filtering and rinsing operation.

Also disclosed herein is a method for improving the stability of a kaolin slurry comprising:

filtering and rinsing the kaolin slurry by water to remove salt residue therefrom, wherein the kaolin slurry comprises kaolin having no more than about 80% by weight particles having an ESD of less than 2 microns; and adding an effective amount of at least one stabilizer, so that the stability of the resulting kaolin slurry is improved as measured by a 28-day pour test.

The term "improve" means that the stability as measured by a 28-day pour test of a kaolin slurry subject to the method disclosed herein is higher, i.e., a higher percentage of the treated kaolin slurry is poured than the originally untreated kaolin slurry.

All percentages and amounts expressed herein are by weight. All amounts, percentages, and ranges expressed herein are approximate.

BRIEF DESCRIPTION OF DRAWING

FIG. 1 shows a diagram of exemplary methods for processing kaolin.

This coarse platy kaolin clay was first spray-dried, and then subjected to one of the six methods as shown in FIG. 1—control, A, B, C, D, and E.

The solid content, Brookfield viscosity, Hercules viscosity, and stability using the pour test were measured for each resulting kaolin slurry made from those six methods.

The T-bar method was used to measure the vertical viscosity distribution of the samples, which changes as settling occurs over time. Typically, the viscosity of the top portion of a sample will decrease and that of the lower portion will increase as settling occurs. T-bar measurements are made using a Brookfield viscometer fitted with a Brookfield Helipath Stand and a special "T-bar" type spindle. The Helipath stand slowly raises or lowers the Brookfield viscometer so that the rotating shearing element of the T-bar spindle describes a helical path through the test sample. By always cutting into fresh material, the problems of channeling or separating are minimized. In the current example, samples can be considered fully settled when the upper T-bar viscosity approaches "0" cps and the lower approaches 400,000 cps. In the current example, monitoring of a given sample was terminated after a full settling measurement.

The pour test method was also used to assess the long term stability of the kaolin slurries. In the pour test, a number of samples of the slurry were placed into beakers and weighed. At the selected time intervals, one of the beakers was upended and the sample was allowed to pour out for a period of 1 minute. The beaker was then re-weighed and the percentage of sample that successfully poured from the beaker was determined as a percentage of the total initial sample weight.

The results are shown in the table below:

| | Solid | CPS #2, @ | Dynes @ | T-Bar Viscosity | | | | | Poured |
|---|---|---|---|---|---|---|---|---|---|
| | % | 20 rpm | 4400 rpm | 0 day | 7 day | 14 day | 21 day | 28 day | % |
| A (Comparative) | 58.3 | 320 | 580 rpm | 0/0 | 0/400,000+ | —/— | —/— | —/— | 18.5 |
| B (Comparative) | 49.8 | 300 | 8.7 dynes | 1600/1600 | 2400/22400 | 0/180,000 | 0/400,000+ | —/— | 26.7 |
| C (Comparative) | 56.7 | 310 | 1240 rpm | 1000/1000 | 2000/400,000+ | —/— | —/— | —/— | 16.7 |
| D (Inventive) | 47.4 | 330 | 6.0 dynes | 800/800 | 3000/12000 | 4000/17000 | 3000/26000 | 0/42,000 | 89 |
| E (Comparative) | 55.8 | 270 | 1820 rpm | 0/0 | 0/400,000+ | —/— | —/— | —/— | 20.0 |
| Control | 52.9 | 610 | 100 dynes | 4000/4000 | 10,000/64,000 | 24,000/400,000+ | —/— | —/— | —/— |

The present invention is further illuminated by the following non-limiting examples, which are intended to be purely exemplary of the invention. In the examples shown below, the following abbreviations are used:
C211=sodium polyacrylate; and
/t=number of pounds per ton.
CMC=carboxymethylcellulose

EXAMPLES

Example 1

In this example, a coarse platy kaolin clay having a particle size distribution such that about 56% by weight of the particles have an ESD of less than 2 microns and about 9% by weight of the particles have an ESD of less than 0.25 microns.

As shown in the table, the kaolin slurry made under the method D, which is in accordance with the present disclosure, is stabilized, and has a 28-day pour test result of about 89%, exhibiting significant improved long term stability.

Example 2

Samples of a spray dried hydrous kaolin having a particle size of 33%<2 microns, a shape factor of about 20 and a GE Brightness of about 87, were made down at about 58% solids. The slurries were dosed with CMC PE-30 at various increments from 0.5 pounds per ton to 8 pounds per ton. Additionally, samples were stabilized by partially flocculating the slurries with sulfuric acid. The mixture was mixed and diluted with water to obtain a final Brookfield viscosity ranging from 600 cps to 700 cps when read with a #2 spindle at 20 rpm. The samples were then poured into a pint jar for a 28 day stability test in accordance with the procedures described below. The samples were tested for solids concentration, Brookfield viscosity at 20 rpm, pH, and Hercules viscosity before beginning the stability test.

The stability test includes monitoring the viscosity of the slurry over a 28 day period using a T-bar spindle. Readings were taken at 7 day intervals and were read at about ½ inch from the top surface of the slurry for the upper reading and about ½ inch from the bottom for the lower reading. After 28 days, the weight percent of the slurry that poured out of the jar in 1 minute was measured and was designated as the first pour. The sample was returned to the jar and shaken for a few seconds and again poured out for 1 minute to obtain the weight percent of the slurry for the second pour. Brookfield viscosity and Hercules viscosity were then measured on this material.

In order to evaluate a slurry with no or very little polyacrylate a second series of tests were run. For the second set of experiments, a slip was flocculated with sulfuric acid to a pH 3 and bleached with 2 pounds per ton sodium hydrosulfite. This was then filtered and the filter cake was used for the following experiments. These samples were then prepared and tested as described above.

When CMC PE-30 was used as the stabilizer, the slurries required high dosages to maintain a stable slurry for the full 28 days of the test. See Table 2. Good results were not obtained until a dose rate of 8.0 pounds per ton was used.

TABLE 2

Tests Using CMC

| Chemical | #T | pH | % solids | Brookfield (cps) #2 @20 rpm | Hercules (rpm) | Days stable | Result | Pour test % |
|---|---|---|---|---|---|---|---|---|
| none | 0.0 | 6.7 | 58.0 | 544 | 2230 | 28 | settled | |
| CMC PE30 | 0.5 | 6.7 | 58.0 | 540 | 2170 | 14 | settled | |
| CMC PE30 | 1.0 | 6.7 | 58.0 | 600 | 1882 | 7 | settled | |
| CMC PE30 | 2.0 | 6.7 | 58.0 | 620 | 1614 | 14 | settled | |
| CMC PE30 | 4.0 | 6.7 | 58.0 | 724 | 1410 | 21 | settled | |
| none | 0.0 | 7.1 | 58.0 | 620 | 1458 | 21 | settled | |
| CMC PE30 | 0.5 | 7.1 | 58.0 | 640 | 1540 | 7 | settled | |
| CMC PE30 | 1.0 | 7.0 | 58.0 | 480 | 1328 | 7 | settled | |
| CMC PE30 | 2.0 | 6.9 | 58.0 | 606 | 1206 | 14 | settled | |
| CMC PE30 | 4.0 | 6.9 | 57.9 | 670 | 1206 | 14 | settled | |
| CMC PE30 | 2.0 | 6.8 | 57.9 | 540 | 1430 | 7 | settled | |
| CMC PE30 | 8.0 | 7.1 | 50.0 | 480 | | 28 | stable | 95.7 |
| CMC PE30 | 8.0 | 7.1 | 52.5 | 620 | | 28 | stable | 92.9 |
| CMC PE30 | 8.0 | 7.1 | 50.0 | 412 | | 28 | stable | 97.0 |
| CMC PE30 | 8.0 | 7.1 | 52.5 | 644 | | 28 | stable | 89.6 |

Example 3

The use of sulfuric acid to partially flocculate the slurry while still allowing it to remain fluid enough to pump was also tested as a mechanism for stabilizing the coarse slurries of interest. These tests showed that the coarse filler slurry could be stabilized most effectively by using sulfuric acid at a pH ranging from about 5.5 to about 6.0. See Table 3.

TABLE 3

Tests Using Sulfuric Acid

| Chemical | #T | pH | % solids | Brookfield (cps) #2 @20 rpm | Hercules (dynes) | Days stable | Result | Pour test % |
|---|---|---|---|---|---|---|---|---|
| H$_2$SO$_4$ | pH 6.0 | 6.0 | 58.0 | 700 | | 28 | stable | 95.0 |
| H$_2$SO$_4$ | pH 6.5 | 6.5 | 58.0 | 600 | | 21 | settled | |
| CMC + H$_2$SO$_4$ | 1 + pH 6.5 | 6.5 | 58.0 | 620 | | 7 | settled | |
| H$_2$SO$_4$ | pH 5.5 | 5.4 | 55.3 | 600 | 10.8 | 28 | stable | 97.2 |
| H$_2$SO$_4$ | pH 5.0 | 5.0 | 52.7 | 600 | 5.0 | 28 | stable | 95.5 |
| H$_2$SO$_4$ | pH 5.5 | 5.5 | 54.6 | 600 | 11.5 | 28 | stable | 97.8 |
| H$_2$SO$_4$ | pH 5.0 | 5.0 | 52.0 | 600 | 5.5 | 28 | stable | 96.2 |

These tests show that pH alone could be used to make a stable slurry from the coarse hydrous kaolin slurry. For example, the pH may range from about 5.5 to about 6.0. However, without the addition of a small amount of polyacrylate the slurry solids should be maintained lower than about 50% in order to be fluid enough to pump easily. The addition of just 0.5 pounds per ton (i.e., about 0.25 kilograms per ton) could allow the solids loading of the slurry to increase into the range of about 54% to about 58%. For example, results could be achieved when the polyacrylate was added after the soda ash or at the same time. Excessive shearing can also have a detrimental effect on the slurry solids. For example, a test that sheared the slurry for 30 minutes in a Waring blender reduced the solids of the final slurry from 57% to 54%.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention.

Other embodiments of the invention will be apparent to those skilled in the art from consideration of the specification. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed:

1. A method of making a stabilized kaolin slurry, comprising: filtering and rinsing a kaolin slurry to remove salt residue therefrom until said resulting kaolin has a conductivity of no more than about 100 μS; resolubilizing said resulting kaolin to form a resolubilized slurry; and adding at least one stabilizer to the resolubilized slurry, wherein said stabilized kaolin slurry comprises kaolin having a shape factor of at least 25.

2. The method according to claim 1, wherein said stabilized kaolin slurry has a 28-day pour test result of at least 80% poured.

3. The method according to claim 2, wherein said stabilized kaolin slurry has a 28-day pour test result of at least 85% poured.

4. The method according to claim 3, wherein said stabilized kaolin slurry has a 28-day pour test result of at least 89% poured.

5. The method according to claim 1, wherein said resulting kaolin has a conductivity of no more than about 80 μS.

6. The method according to claim 1, wherein said stabilized kaolin slurry comprises kaolin having no more than about 80% by weight of particles having an equivalent spherical diameter (ESD) of less than 2 microns.

7. The method according to claim 6, wherein said stabilized kaolin slurry comprises kaolin having about 25% to about 70% by weight particles having an ESD of less than 2 microns.

8. The method according to claim 6, wherein said stabilized kaolin slurry comprises kaolin having about 20% to about 65% by weight particles having an ESD of less than 2 microns.

9. The method according to claim 8, wherein said stabilized kaolin slurry comprises kaolin having about 25% to about 45% by weight particles having an ESD of less than 2 microns.

10. The method according to claim 9, wherein said stabilized kaolin slurry comprises kaolin having about 35% by weight particles having an ESD of less than 2 microns.

11. The method according to claim 1, wherein said at least one stabilizer comprises carboxymethylcellulose.

12. The method according to claim 1, wherein said at least one stabilizer comprises at least one cellulosic thickener chosen from alkyl celluloses, ethyl hydroxyethyl celluloses, hydroxymethyl celluloses, hydroxyethyl celluloses, and hydroxypropyl celluloses.

13. The method according to claim 1, wherein said at least one stabilizer is chosen from montmorillonite, smectite clays, hydrophobically modified ethoxylated urethanes, polyacrylates, polyvinyl pyrrolidone, sodium alginate, xanthan gum, silica thickeners, sodium magnesium silicate, acrylic acid copolymers, and nonionic hydrophobically modified polyethers.

14. The method according to claim 1, wherein said at least one stabilizer is present in an amount ranging from about 0.01% to about 4% by weight, relative to the total weight of the slurry.

15. The method according to claim 1, wherein substantially no dispersant is added to said kaolin slurry.

16. The method according to claim 1, further comprising adding at least one dispersant.

17. The method according to claim 16, wherein the at least one dispersant is chosen from polyacrylates, polyphosphates, and silicates.

18. The method according to claim 16, wherein the at least one dispersant is present in an amount ranging from about 100 ppm to about 500 ppm on a dry basis relative to the total weight of the stabilized kaolin slurry.

19. The method according to claim 1, further comprising flocculating said kaolin slurry prior to said filtering and rinsing.

20. The method according to claim 19, wherein said flocculation comprises lowering the pH of said kaolin slurry to a value of about 5 or less.

21. The method according to claim 1, further comprising spray drying said kaolin slurry prior to said filtering and rinsing.

22. A method for improving the stability of a kaolin slurry comprising: filtering and rinsing a kaolin slurry with water to remove salt residue therefrom, wherein said kaolin slurry comprises kaolin having no more than about 80% by weight particles having an ESD of less than 2 microns; and adding an effective amount of at least one stabilizer, such that the stabilized kaolin slurry has a 28-day pour test result of at least 80% poured, wherein said kaolin slurry has a solids content of greater than 40%, wherein the method further comprises adjusting the pH of said kaolin slurry to have a range of about 4.5 to about 6.5 and adding at least one dispersant to said kaolin slurry, and wherein the at least one dispersant is present in an amount ranging from about 100 ppm to about 500 ppm on a dry basis relative to the total weight of the kaolin slurry.

23. The method according to claim 22, wherein said at least one dispersant is chosen from polyacrylates, polyphosphates, and silicates.

24. The method according to claim 22, wherein said stabilized kaolin slurry has a Brookfield viscosity at 50% adjusted solids ranging from about 300 cps to about 700 cps using a #2 spindle at 20 rpm.

25. The method according to claim 22, wherein said stabilized kaolin slurry has a Hercules viscosity at 50% adjusted solids of less than about 10 dynes at 4400 rpm using an "A" bob.

26. The method according to claim 22, wherein said slurry comprises kaolin having about 25% to about 70% by weight particles having an ESD of less than 2 microns.

27. The method according to claim 26, wherein said slurry comprises kaolin having about 25% to about 45% by weight particles having an ESD of less than 2 microns.

28. The method according to claim 27, wherein said slurry comprises kaolin having about 35% by weight particles having an ESD of less than 2 microns 29. The method according to claim 22, wherein said stabilized kaolin slurry has a 28-day pour test result of at least about 85% poured.

30. The method according to claim 29, wherein said stabilized kaolin slurry has a 28-day pour test result of at least about 89% poured.

31. A method of making a stabilized kaolin slurry, comprising: filtering and rinsing a kaolin slurry to remove salt residue therefrom until said resulting kaolin has a conductivity of no more than about 100 μS; resolubilizing said resulting kaolin to form a resolubilized slurry; adding at least one stabilizer to the resolubilized slurry; and adding at least one dispersant, wherein the at least one dispersant is present in an amount ranging from about 100 ppm to about 500 ppm on a dry basis relative to the total weight of the stabilized kaolin slurry.

32. A method of making a stabilized kaolin slurry, comprising: filtering and rinsing a kaolin slurry to remove salt residue therefrom until said resulting kaolin has a conductivity of no more than about 100 μS; resolubilizing said resulting kaolin to form a resolubilized slurry; adding at least one stabilizer to the resolubilized slurry; and flocculating said kaolin slurry prior to said filtering and rinsing, wherein said flocculation comprises lowering the pH of said kaolin slurry to a value of about 5 or less.

\* \* \* \* \*